United States Patent [19]

Knott

[11] Patent Number: 5,831,103

[45] Date of Patent: Nov. 3, 1998

[54] HALOGEN-MAGNESIUM-ALUMINUM HYDRIDOHALIDES, METHODS FOR THEIR SYNTHESIS AND THEIR USE AS REDUCING AGENTS

[75] Inventor: Wilfried Knott, Essen, Germany

[73] Assignee: Th. Goldschmidt AG, Essen, Germany

[21] Appl. No.: 597,566

[22] Filed: Feb. 2, 1996

Related U.S. Application Data

[63] Continuation-in-part of Ser. No. 139,374, Oct. 20, 1993, abandoned.

[30] Foreign Application Priority Data

Oct. 20, 1992 [DE] Germany .......................... 42 35 334.3

[51] Int. Cl.$^6$ .................................................. C07D 307/04
[52] U.S. Cl. ............................................ 549/504; 556/186
[58] Field of Search .............................. 549/504; 556/186

[56] References Cited

U.S. PATENT DOCUMENTS

| | | | |
|---|---|---|---|
| 3,387,948 | 6/1968 | Snyder | 23/365 |
| 3,849,542 | 11/1974 | Snover | 423/644 |
| 4,832,934 | 5/1989 | Bogdanovic et al. | 423/463 |

FOREIGN PATENT DOCUMENTS

| | | |
|---|---|---|
| 0003564 | 7/1982 | European Pat. Off. . |
| 845338 | 3/1951 | Germany . |
| 921986 | 11/1952 | Germany . |
| 4039278 | 11/1962 | Germany . |
| 785348 | 7/1955 | United Kingdom . |

OTHER PUBLICATIONS

E.C. Ashby et al. "Preparation of HMgX Compounds & Their Reactions with Alane & Borane in Tetrahydrofuran", Inorganic Chemistry, vol. 16, No. 11, 1977, pp. 2941 to 2944.

E.C. Ashby et al. "Concerning the Preparation of Magnesium Aluminum Hydride. A study of the Reactions of Lithium and Sodium Aluminium Hydrides with Magnesium Halides in Ether Solvents", Inorganic Chemistry, vol. 9, No. 2, Feb. 1970, pp. 325 to 332.

*Primary Examiner*—Ba K. Trinh
*Attorney, Agent, or Firm*—Anderson, Kill & olick, P.C.

[57] ABSTRACT

Halogen magnesium aluminum hydridohalides of the general formula

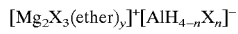

$[Mg_2X_3(ether)_y]^+[AlH_{4-n}X_n]^-$ wherein X is chlorine, bromine or iodine, y is a number from 0 to 6, n is a number from 1 to 3 and ether is an aliphatic or cylcoaliphatic ether with 2 to 30 carbon atoms, with the exception of t-butyl ether, with a dipole moment>0.5 Debye and a melting point of<0° C. are prepared. The invention furthermore relates to a method for the synthesis of these compounds and to a method of reducing functional organic compounds utilizing the inventive compounds.

1 Claim, No Drawings

HALOGEN-MAGNESIUM-ALUMINUM HYDRIDOHALIDES, METHODS FOR THEIR SYNTHESIS AND THEIR USE AS REDUCING AGENTS

This is a continuation-in-part application of Ser. No. 08/139,374, filed Oct. 20, 1993, now abandoned.

FIELD OF INVENTION

The invention relates to halogen magnesium aluminum hydridohalides of the general formula $$[Mg_2X_3(ether)_y]^+[AlH_{4-n}X_n]^-$$

wherein x is chlorine, bromine or iodine, y is a number from 0 to 6, n is a number from 1 to 3, and ether is an aliphatic or cylcoaliphatic ether with 2 to 30 carbon atoms, with the exception of t-butyl ether, with a dipole moment >0.5 Debye and a melting point of <0° C.

The invention furthermore relates to a method for the synthesis of these compounds and to a method of reducing functional organic compounds utilizing the inventive compounds.

BACKGROUND INFORMATION AND PRIOR ART

Reductions with complex metal hydrides are standard reactions of organic-chemistry. With regard to the state of the art, reference is made to N. G. Gaylord, Reduction with Complex Metal Hydrides, Interscience Publishers, Inc., New York, 1956. Of the complex metal hydrides, the ether-soluble $LiAlH_4$ is the one most frequently used. If it were possible to replace the relatively expensive lithium by the cheaper magnesium, the costs of the reduction could be reduced appreciably. There has therefore been no lack of attempts to synthesize $Mg(AlH_4)_2$. However, contradictory information is found in the literature concerning the synthesis and properties of $Mg(AlH_4)_2$.

An ether-soluble $Mg(AlH_4)_2$ was described for the first time by Wiberg and Bauer in the Zeitschrift for Naturforschung 5B, 397 (1950) and 7B, 131 (1952) as well as in the German patent 845 338. The synthesis is said to succeed according to the following method:

$$4MgH_2 + 2AlCl_3 ===> Mg(AlH_4)_2 + 3MgCl_2 \quad (1)$$

$$MgH_2 + 2AlH_3 ===> Mg(AlH_4)_2 \quad (2)$$

$$2LiAlH_4 + MgBr_2 ===> Mg(AlH_4)_2 + 2LiBr \quad (3)$$

The $MgH_2$, required for reactions (1) and (2), was obtained by thermolysis of Grignard or diorganomagnesium compounds. Aside from magnesium halide, alkenes are obtained as unwanted by-products. Method (3) has the disadvantage that relatively expensive $LiAlH_4$ is used. Moreover, Ashby observed later that the reaction (3) in tetrahydrofuran leads not to $Mg(AlH_4)_2$, but to $BrMgAlH_4$, which can also be obtained from HMgBr and $AlH_3$ (Ashby et al., Inorg. Chem. 9, 325 (1970) and Inorg. Chem. 16, 941-(1977)).

According to Hertwig (German patent 921 986) the reaction of Grignard reagents with $AlX_3$ and hydrogen results in the formation of $ClMgAlH_4$, which can be converted by thermolysis into magnesium alanate:

$$4RMgX + AlX_3 + 4H_2 ===> XMg(AlH_4) + 3MgX_2 + 4RH \quad (4)$$

$$2XMg(AlH_4) ===> Mg(AlH_4)_2 + MgX_2 \quad (5)$$

According to the British patent 785,348, the reaction of a mixture of $MgH_2$ and aluminum leads to $Mg(AlH_4)_2$.

U.S. Pat. No. 3,387,948 relates to the reaction $$MgH_2 + 3H_2 + 2Al ===> Mg(AlH_4)_2 \quad (6)$$

and should take place under drastic reaction conditions.

However, none of these methods satisfy the technical requirements.

U.S. Pat. No. 4,832,934 discloses the synthesis of $[Mg_2X_3(ether)_y]^+[AlH_4]^-$, wherein X is a halogen, ether is a cyclic or aliphatic ether and y is a number from 0 to 6. It is stated in column 1, line 65 to column 2, line 2 of this patent that substituting the less expensive, soluble halogen magnesium alanate for the expensive lithium alanate, still appears to be desirable. However, the realization of this concept is said to have always failed owing to the fact that an efficient synthesis for the inexpensive starting material $MgH_2$ has not been available up to this time.

The U.S. Pat. No. 4,832,934 teaches that the highly active $MgH_2$, which is synthesized according to a method of the European patent 0 003 564, is outstandingly suitable for producing halogen magnesium alanates from aluminum halides.

The method of the European patent 0 003 564 for the synthesis of magnesium hydrides with the help of hydrogen and transition metals as catalysts is characterized in that magnesium is reacted with hydrogen in the presence of a catalyst, consisting of a halide of a metal of auxiliary groups IV to VIII of the periodic system, and an organometallic compound or a magnesium hydride as well as, optionally, in the presence of a polycyclic aromatic compound or a tertiary amine, as well as optionally in the presence of a magnesium halide $MgX_2$. Preferably, the reaction takes place in tetrahydrofuran at pressures of 1 to 300 bar and at temperatures of 0° to 200° C., the ratio of magnesium to transition metal being $10^4$ to 10:1 and the ratio of transition metal to organomagnesium compound or magnesium hydride being 0.1:1 to 10:1. As transition metal halides, particularly chromium, titanium and iron halides are used. Magnesium anthracene is employed as organomagnesium compound. Anthracene, tetracene or benzanthracene are selected as polycyclic aromatic compounds. Compounds having the formula $NR_3$, in which R represents alkyl or cycloalkyl groups, serve as tertiary amines.

Starting out from this, the U.S. Pat. No. 4,832,934 describes the synthesis of the halogen magnesium alanates using this special magnesium hydride, which is accessible through complex mixtures of catalysts by reacting this highly disperse magnesium hydride with aluminum halides in a solvent. The use of this complex catalyst is emphasized as being absolutely necessary. In column 3, lines 27 to 34, it is explicitly stated that the synthesis of the $[Mg_2X_3(ether)_y]^+[AlH_4]^-$ does not succeed unless magnesium hydride is used, which has been prepared from the elements at a high temperature. In a comparison experiment (column 5, Comparative Example), commercially available magnesium hydride, prepared at high temperatures from the elements, is pre-ground for 2 hours in a glass ball mill and then mixed with $AlCl_3$, tetrahydrofuran and ethyl benzoate. The mixture was inactive and no reduction of ethyl benzoate to benzyl alcohol could be detected. Accordingly, no $[Mg_2X_3(ether)_y]^+[AlH_4]^{31}$ was formed as reducing agent.

The present invention is concerned with the technical problem of making this inexpensive magnesium hydride, which is inactive according to U.S. Pat. No. 4,832,934, usable for the synthesis of complex magnesium aluminum hydride compounds, so that it is possible to do the synthesis without using the more complex catalysts of the European patent 0 003 564, which are difficult to handle and expensive. From the point of view of industrial synthesis planning, this appears to be particularly desirable for avoiding product-contaminating impurities.

OBJECT OF THE INVENTION

An object of the present invention is halogen magnesium aluminum hydridohalides of the general formula disclosed herein. Another object of the invention is a method for the synthesis of these compounds and a method for reducing functional organic compounds utilizing these compounds.

SUMMARY OF THE INVENTION

Surprisingly, it has now been found that a new compound of the general formula

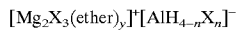

wherein
x is chlorine, bromine or iodine,
y is a number from 0 to 6,
n is a number from 1 to 3, and
ether is an aliphatic or cylcoaliphatic ether with 2 to 30 carbon atoms, with the exception of t-butyl ether, with a dipole moment >0.5 Debye and a melting point of <0° C.
if, pursuant to the invention, the aluminum halide A $X_3$ is reacted with magnesium hydride $MgH_2$ while being ground constantly in an organic solvent.

The activating grinding during the entire reaction time and not, as described in U.S. Pat. No. 4,832,934, before the reaction, thus is of decisive importance. Suitable grinding equipment are vibration grinding mills, attritor mills, annular gap agitator ball mills, Wheeler mills, Jet-O-Mizers, Eagle mills, fluidized bed jet mills and bead mills of the Dynomill and Supermill type.

Preferably, a magnesium hydride is used, which has been synthesized by the method of the German offenlegungsschrift 40 39 278. A method is thus preferred, which has the distinguishing features that $MgH_2$, which has been produced from the elements, is used for the reaction, magnesium hydride with a particle size of ≦400 Mm being added as catalyst in an amount of at least 1.2% by weight based on the magnesium to be hydrogenated from the start of the reaction to the magnesium that is to be hydrogenated and the hydrogenation being carried out at a temperature of ≧250° C. and a pressure of 0.5 to 5 MPa with constant stirring of the reaction mixture.

Preferably, tetrahydrofuran, diethyl ether, dimethoxyethane (glyme), di-n-butyl ether or 1,3-dioxolane is used for the inventive method of synthesizing

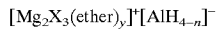

However, tetrahydrofuran is particularly preferred.

| Inventive Ether | Dipole Moment in Debye | Melting Point in °C. |
|---|---|---|
| Tetrahydrofuran | 1.63 | −108° |
| Diethyl ether | 1.18 | −116° |
| Dimethoxyethane | 1.81 | −58° |
| Di-n-butyl ether | 1.18 | −98° |
| 1,3-Dioxolane | 1.47 | −95° |

The reaction can be carried out at room temperature. However, it is preferred that it is carried out at a temperature of −80° to +150° C. and, especially, of −10° to +60° C.

The inventive method and, in particular, the preferred variation utilizing magnesium hydride with a particle size of ≦400mm as described above, enable halogen magnesium aluminum hydridohalides to be synthesized from the inexpensive raw materials magnesium, hydrogen and aluminum halide without involving contaminating catalysts.

The new halogen magnesium aluminum hydridohalides can be used for reducing purposes directly in solution or, after removal of the solvent, in solid form. The $MgCl_2$, obtained as a by-product, does not interfere with the subsequent reactions and can, if necessary, be removed.

The halogen magnesium aluminum hydridohalides are good reducing agents for a plurality of functional groups in organic compounds, such as aldehydes, esters, ketones, alkylhalides and carboxylic acids and their anhydrides, the reduction taking place in very good yields. It is possible to change the solvent for the reductions.

Since they are not pyrophoric, the compounds combine extremely safe handling with a high reducing capacity at a lower price than that of comparable metal hydrides and their use is therefore significantly more advantageous than that of, for example, lithium alanate.

In the following examples, the synthesis of the inventive compounds by the inventive method is shown and their reducing capacity is demonstrated, it being understood that the examples are provided by way of illustration and not by way of limitation. All experiments were carried out under argon as inert gas.

EXAMPLE 1

Magnesium hydride (19.5 g, 0.67 moles, with a hydride content of 91%) is suspended in 400 g of tetrahydrofuran and activated by grinding in a glass ball mill. Aluminum chloride (40.0 g, 0.3 moles), dissolved in 160 g of tetrahydrofuran, is slowly added dropwise, a slight evolution of heat being noticeable. At the end of the dropwise addition, the reaction batch is heated at the refluxing temperature with further, constant grinding. During the course of the reaction, samples are taken from the reactor with a syringe and centrifuged and the clear supernatant liquid is hydrolyzed and the acid value is determined. After 4 hours, the clear supernatant liquid reacts in an alkaline manner. A gas volumetric hydrogen determination confirms a hydrogen content of 1.5 mmoles of H/g of solution. For reducing experiments, the entire batch is centrifuged and the clear hydride solution is used further.

EXAMPLE 2

The chlorine magnesium aluminum hydridochloride solution (22.4 g, 11.2 mmoles), prepared in Example 1, is added to a Schlenk vessel and stirred with a magnetic stirrer. Methyl benzoate (1.9 mL, 15 mmoles) is then pipetted in slowly. After the vigorous exothermic reaction has subsided, stirring is continued for 1 hour, after which the reaction formulation is decomposed by pouring it into ice-cooled aqueous HCl. After separating the phases and repeatedly extracting the aqueous phase with ether, the combined ether extracts are dried over $Na_2SO_4$. After the solvent is drawn off, the residue is analyzed by $^1$-NMR spectroscopy. Yield: 85% benzyl alcohol.

EXAMPLE 3

Repeating the procedure of Example 2, 22.4 g (11.2 mmoles) of chlorine magnesium aluminum hydridochloride solution are reacted with 1.81 g (15 mmoles) of acetophenone. After the reaction product is worked up, $^1$ H-NMR spectroscopy confirms a 95% yield of 1-phenylethanol.

EXAMPLE 4

Similar to Examples 2 and 3, 3.18 g (30 mmoles) of benzaldehyde are reacted with 44.8 g (22.4 mmoles) of chlorine magnesium aluminum hydridochloride solution. The spectroscopically determined yield of benzyl alcohol is 97%.

EXAMPLE 5

Similar to the preceding examples, 2.77 g (15 mmoles) of 10-undecanoic acid are reacted with 22.4 g (11.2 mmoles) of chlorine magnesium aluminum hydridochloride solution. After the usual working up, 10-undecyl alcohol is detected in a 57% yield ($^1$-H NMR).

EXAMPLE 6

As in the preceding examples, 2.46 g (15 mmoles) of 5-norbornene-2,3-dicarboxylic acid anhydride are reacted with 39.2 g (19.6 mmoles) of the chlorine magnesium aluminum hydridochloride solution prepared in Example 1. The yield of 2,3-bis-(hydroxymethyl)-norbornene-(5) is 85% ($^1$H-NMR).

EXAMPLE 7

Crotonaldehyde (2.10 g, 30 mmoles) is reacted with 35 mL (10.65 moles) of a chlorine magnesium aluminum hydridochloride solution prepared as in Example 1. Crotyl alcohol is formed in a yield of 88% ($^1$H-NMR).

EXAMPLE 8

As in the other examples, 3.00 g (30 mmoles) of methyl isobutyl ketone are reacted with 30 g (15 mmoles) of the chlorine magnesium aluminum hydridochloride solution prepared in Example 1. $^1$H-NMR spectroscopy confirms an 82% yield of 4-methylpentan-(2)-ol.

EXAMPLE 9

Benzophenone (2.73 g, 15 mmoles) is reacted with 30 mL (8.13 mmoles) of a chlorine magnesium aluminum hydridodichloride solution prepared as in Example 1. After the product is worked up, the yield of diphenylmethanol, determined by $^1$H-NMR spectroscopy, is 94%.

EXAMPLE 10

Magnesium hydride (9.2 g, 0.32 moles, hydride content of 91%) is activated by grinding with 21.0 g (0.16 moles) of aluminum chloride in a glass ball mill. 1,2-Dimethoxyethane (450 mL) is siphoned in and a slight evolution of heat can be noted. At the end of the addition, the reaction batch is refluxed with constant, further grinding. The viscosity of the reaction mixture increases greatly after the boiling temperature is reached. After 2.5 hours, the reaction mixture is transferred hot to centrifuge tubes that have been made inert. After centrifuging, the gas volumetric hydrogen determination of the clear hydride solution obtained indicates a content of 0.33 mmoles H/g of solution.

EXAMPLE 11

The chlorine magnesium aluminum hydridochloride solution (185 g, 20.35 mmoles) is added to a 2-neck flask and stirred with a magnetic stirrer. α-Angelica lactone (98%, 2.44 g, 25.4 mmoles) is then added slowly dropwise at 80°C. At the end of the addition, stirring is continued for 1 hour at 80° C. The reaction mixture is then poured into ice-cold, aqueous sodium chloride solution and neutralized with dilute hydrochloric acid. After phase separation and repeated extraction of the aqueous phase with ether, the combined ether extracts are dried over sodium sulfate. After the solvent is removed, the residue is analyzed by $^1$H-NMR spectroscopy. Yield: 75% 1,4-pentanediol.

EXAMPLE 12
(not of the invention)

Magnesium hydride (hydride content of 91%, 13.0 g, 0.49 moles) and 20.0 g (0.15 moles) of aluminum chloride are added to a glass ball mill and ground. 1,4-Dioxane (450 mL), which has a dipole moment of 0 Debye, is siphoned in and the reaction mixture is heated to the refluxing temperature while continuing to grind further. During the reaction, samples are taken from the reactor by means of a syringe and centrifuged and the hydrogen content of the clear supernatant liquid is measured gas volumetrically. After a reaction time of 3 hours, the experiment is discontinued, since the inventive hydride cannot be detected in the dioxane phase.

EXAMPLE 13
(not of the invention)

Magnesium hydride (hydride content of 90%, 10.7 g, 0.36 moles) and 24.3 g (0.18 moles) of aluminum chloride are activated in a glass ball mill by grinding. Methyl t-butyl ether (450 mL), cooled to −70°C., is then siphoned in. An exothermic reaction can be noted. The viscosity of the reaction batch increases and the batch assumes an orange coloration. At the end of the addition, the batch is heated at the refluxing temperature with continuous, steady grinding. During the reaction, samples are taken by means of a syringe and centrifuged and the clear supernatant liquid is hydrolyzed. The hydrogen determination confirms that there is no hydridic hydrogen in the clear methyl t-butyl ether phase.

The balanced chemical reaction for the claimed compound as follows:

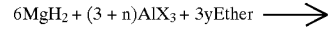

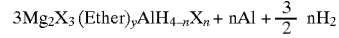

Furthermore, the Example leading to the preparation of the inventive product is further described herein in details as follows:

The reaction occurs according to the equation

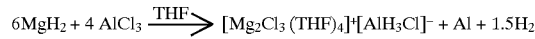

9.7 g (26.32 g/mol; 92.6%; 0.34 mol) of magnesium hydride is placed in a pebble mill diluted with 400 g THF and activated by grinding at 1000 rotation/min. 30.8 g (133.34 g/mol; 99%; 0.23 mol.) aluminum chloride, dissolved in 160 g precooled tetrahydrofurane, is slowly added in drops whereby a slight heat development is noticeable. After finishing the drop addition, the reaction mixture is heated during further constant grinding up to a reflux temperature. During the reaction, samples are removed from the reactor by means of a syringe, which are then centrifuged and the clear remaining compound is hydrolyzed. From it, the acid value is determined until after about 4 hours no acid aluminum chloride is noticeable. The resulting hydrogen is collected. A gas-volumetric determination proves a hydrogen content of 1.5 mMol H$^-$/g solution. For reduction tests the entire mixture is centrifuged and the clear hydride solution is used further. In the treatment, the precipitated elemental aluminum is found again as precipitation on the glass bottom.

For clarification of the structure, part of the hydride solution is taken off and compressed at room temperature which yields a white powder with the following analysis values

| | | |
|---|---|---|
| 9,7% Mg | 2 | |
| 5,4% Al | 1 | |
| 28,4% Cl | 4 | |
| 38,4% C | 16 | |
| 7,1% H | 35 | |

This corresponds to: $[Mg_2Cl_3(THF)_4]^+[AlH_3Cl]^{31}$.

I claim:

1. Halogen magnesium aluminum hydridohalide of a general formula $[Mg_2X_3(ether)_y]^+[AlH_{4-n}X_n]^-$ wherein
  X is chlorine, bromine or iodine,
  y is a number from 0 to 6,
  n is a number from 1 to 3, and
  ether is an aliphatic or cylcoaliphatic ether with 2 to 30 carbon atoms, with the exception of t-butyl ether, with a dipole moment>0.5 Debye and a melting point of<0° C.

* * * * *